United States Patent
Barbu et al.

(10) Patent No.: US 12,538,255 B2
(45) Date of Patent: Jan. 27, 2026

(54) ASSET TRACKING JOINT SOUNDING REFERENCE SIGNAL (SRS) TRANSMISSION

(71) Applicant: NOKIA TECHNOLOGIES OY, Espoo (FI)

(72) Inventors: Oana-Elena Barbu, Aalborg (DK); Johannes Harrebek, Aalborg (DK); Benny Vejlgaard, Gistrup (DK); Ryan Keating, Chicago, IL (US)

(73) Assignee: Nokia Technologies Oy, Espoo (FI)

(*) Notice: Subject to any disclaimer, the term of this patent is extended or adjusted under 35 U.S.C. 154(b) by 364 days.

(21) Appl. No.: 18/027,514

(22) PCT Filed: Aug. 31, 2021

(86) PCT No.: PCT/EP2021/073923
§ 371 (c)(1),
(2) Date: Mar. 21, 2023

(87) PCT Pub. No.: WO2022/069129
PCT Pub. Date: Apr. 7, 2022

(65) Prior Publication Data
US 2023/0379859 A1    Nov. 23, 2023

Related U.S. Application Data

(60) Provisional application No. 63/085,503, filed on Sep. 30, 2020.

(51) Int. Cl.
*H04W 64/00* (2009.01)
*H04L 5/00* (2006.01)

(52) U.S. Cl.
CPC ........... *H04W 64/00* (2013.01); *H04L 5/0051* (2013.01)

(58) Field of Classification Search
CPC .... H04W 64/00; H04L 5/0051; G01S 5/0244; G01S 5/0205; G01S 5/06
See application file for complete search history.

(56) References Cited

U.S. PATENT DOCUMENTS 9,548,845 B2   1/2017  Yi et al.
10,117,193 B2  10/2018 Feuersaenger et al.
(Continued)

FOREIGN PATENT DOCUMENTS

| CN | 109471134 A | 3/2019 |
|----|-------------|--------|
| CN | 110476471 A | 11/2019 |
| WO | 2020/119727 A1 | 6/2020 |

OTHER PUBLICATIONS

Office action received for corresponding Indian Patent Application No. 202347030014, dated Feb. 26, 2024, 7 pages.
(Continued)

*Primary Examiner* — Nizar N Sivji
(74) *Attorney, Agent, or Firm* — Lippes Mathias LLP

(57) ABSTRACT

Systems, methods, apparatuses, and computer program products for asset tracking joint sounding reference signal (SRS) transmission. A location management network node may send a positioning failure message to a serving network node. The serving network node may group devices if one or more criteria are met. When one or more of the devices can be grouped, the serving network node may assign and distribute, to devices, a multi-tag-SRS sequence identifier that may be used by the devices in the group. The serving network node may compute and send, to the devices in the group, a multi-tag-SRS transmit configuration. The devices may perform a joint SRS transmission. The location management network node may compute a location of a centroid for the group of devices associated with the reported metric.

10 Claims, 5 Drawing Sheets

(56) References Cited

U.S. PATENT DOCUMENTS

| | | | |
|---|---|---|---|
| 10,439,847 B2 | 10/2019 | Park et al. | |
| 2014/0080509 A1 | 3/2014 | Siomina et al. | |
| 2017/0302419 A1 | 10/2017 | Liu et al. | |
| 2018/0198562 A1* | 7/2018 | Caretti | H04L 1/009 |
| 2018/0331805 A1* | 11/2018 | Xia | H04B 7/088 |
| 2019/0261300 A1* | 8/2019 | Alles | G01S 5/0036 |
| 2019/0342062 A1 | 11/2019 | Ren et al. | |
| 2019/0394634 A1 | 12/2019 | Akkarakaran et al. | |
| 2020/0169336 A1 | 5/2020 | Modarres Razavi et al. | |
| 2021/0219255 A1* | 7/2021 | Zhang | H04W 36/249 |
| 2021/0344380 A1* | 11/2021 | Dutta | H04L 5/0051 |
| 2022/0353036 A1* | 11/2022 | Gao | H04L 1/1812 |

OTHER PUBLICATIONS

Office action received for corresponding Chinese Patent Application No. 202180066995.X, dated Mar. 28, 2025, 8 pages of office action and no page of translation available.

International Search Report and Written Opinion dated Feb. 24, 2022 corresponding to International Patent Application No. PCT/EP2021/073923.

3GPP TS 38.305 V16.1.0 (Jul. 2020), Technical Specification, 3rd Generation Partnership Project; Technical Specification Group Radio Access Network; NG Radio Access Network (NG-RAN); Stage 2 functional specification of User Equipment (UE) positioning in NG-RAN (Release 16), Jul. 2020.

3GPP TS 38.214 V16.2.0 (Jun. 2020), Technical Specification, 3rd Generation Partnership Project; Technical Specification Group Radio Access Network; NR; Physical layer procedures for data (Release 16), Jun. 2020.

3GPP TS 37.355 V16.1.0 (Jul. 2020), Technical Specification, 3rd Generation Partnership Project; Technical Specification Group Radio Access Network; LTE Positioning Protocol (LPP) (Release 16), Jul. 2020.

3GPP TS 38.331 V16.1.0 (Jul. 2020), Technical Specification, 3rd Generation Partnership Project; Technical Specification Group Radio Access Network; NR; Radio Resource Control (RRC) protocol specification (Release 16), Jul. 2020.

3GPP TS 38.455 V16.0.0 (Jul. 2020), Technical Specification, 3rd Generation Partnership Project; Technical Specification Group Radio Access Network; NG-RAN; NR Positioning Protocol A (NRPPa) (Release 16), Jul. 2020.

Ericsson, "Introduction of NR positioning support," 3GPP Draft R1-1913661, 3GPP TSG-RAN WG1 Meeting #99, Reno, Nevada, USA, Nov. 18-22, 2019.

Huawei et al., "Remaining issues on UL-based positioning," 3GPP Draft; R1-1901575, 3GPP TSG RAN WG1 Meeting #96, Athens, Greece, Feb. 25-Mar. 1, 2019.

Intel Corporation et al., "New WID: NR Positioning Support," RP-190752, 3GPP TSG RAN Meeting #83, Shenzhen, China, Mar. 18-21, 2019.

Qualcomm Incorporated, "New SID on NR Positioning Enhancements," RP-193237, 3GPP TSG RAN Meeting #86, Sitges, Spain, Dec. 9-12, 2019.

* cited by examiner

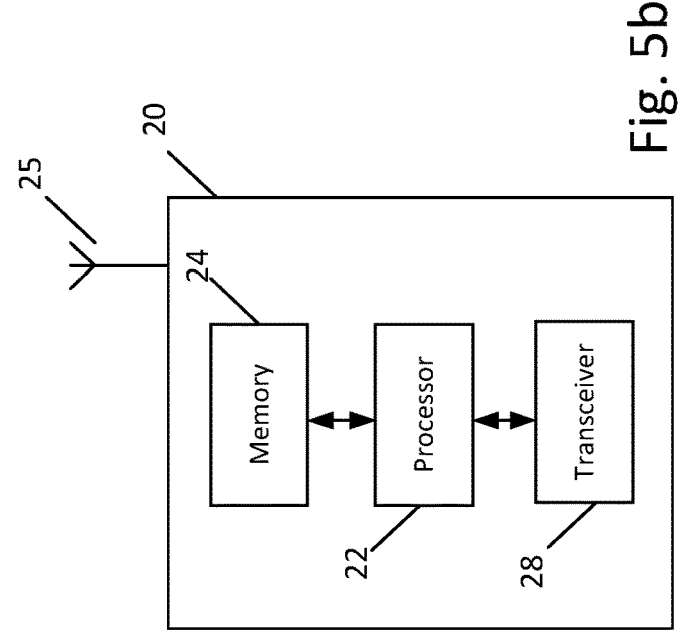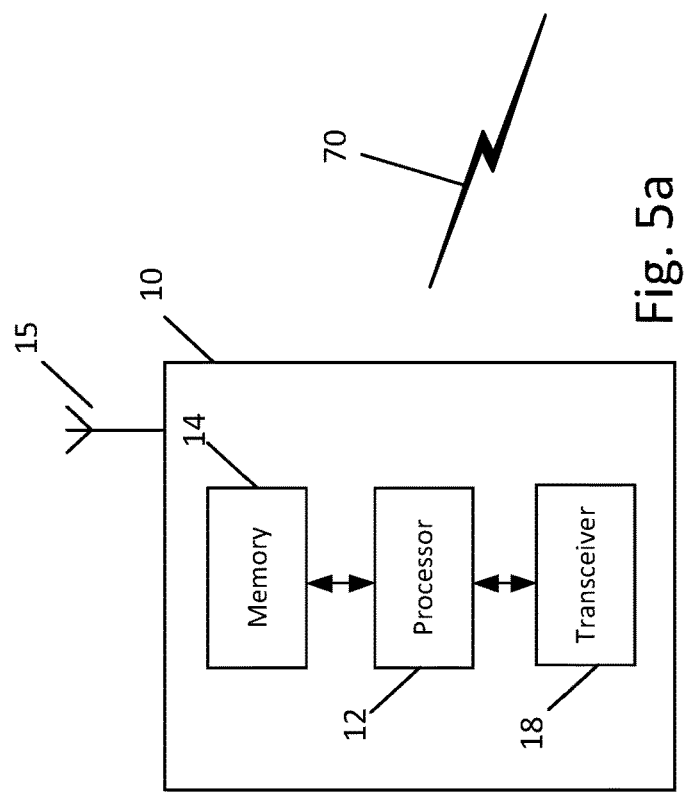

ASSET TRACKING JOINT SOUNDING REFERENCE SIGNAL (SRS) TRANSMISSION

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for asset tracking joint sounding reference signal (SRS) transmission.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR may provide bitrates on the order of 10-20 Gbit/s or higher, and may support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

According to a first embodiment, a method may include transmitting, by a location management network entity, at least one of: one or more position failure reports associated with one or more devices, or information that comprises one or more groups of devices based on one or more criteria. The one or more groups of devices may be associated with transmitting a corresponding joint reference signal. The method may include receiving one or more joint reference signal measurement reports associated with the one or more groups of devices. The method may include determining, based on the one or more joint reference signal measurement reports, a location of the one or more groups of devices.

In a variant, the method may include determining that positioning for the one or more devices fails, and the transmitting of the one or more position failure reports may include transmitting the one or more position failure reports based on determining that the positioning for the one or more devices fails. In a variant, the one or more position failure reports may include a list of identifiers of the one or more devices associated with the failed positioning. In a variant, the method may further include receiving one or more reports that identify the one or more groups of devices after transmitting the one or more position failure reports.

In a variant, the determining of the location of the centroid of the one or more groups may further include determining a boundary of the one or more groups of devices. In a variant, the method may further include determining the one or more groups of devices, and the transmitting of the information that comprises the one or more groups of devices may further include transmitting the information based on determining the one or more groups. In a variant, the one or more groups may be associated with a corresponding serving network node.

In a variant, devices of the one or more groups may be associated with multiple serving network nodes. In a variant, the location may include a centroid of the one or more groups of devices. In a variant, the method may further include requesting that a serving network node determine the one or more groups of devices.

According to a second embodiment, a method may include transmitting, by a serving network node, a message to a group of devices. The message may be associated with configuring the group of devices to transmit a joint reference signal. The group of devices may be based on one or more criteria. The method may include receiving the joint reference signal from the group of devices. The method may include performing a measurement of the joint reference signal. The method may include transmitting a measurement report that comprises the measurement of the joint reference signal.

In a variant, the method may include receiving a failure report associated with one or more devices, grouping the one or more devices into the group of devices based one or more criteria, and transmitting a report that identifies the group of devices. In a variant, the method may include determining an identifier for the joint reference signal, and transmitting the identifier. In a variant, devices of the group of devices may be associated with the serving network node, or at least one of the devices may be associated with one or more other serving network nodes. In a variant, the one or more criteria may include whether the group of devices: share a common serving beam index, have a similar value for a quality metric, have similar timing advances or a standard deviation of the timing advances in the group of devices is smaller than a threshold value, or experience similar propagation conditions.

According to a third embodiment, a method may include receiving, by a device, a message associated with configuring a group of devices to transmit a joint reference signal. The group of devices may be based on one or more criteria. The method may include transmitting the joint reference signal according to the configuration.

In a variant, the method may include receiving an identifier for the joint reference signal. The identifier may be included in the message or in another message. In a variant, transmitting the joint reference signal may comprise transmitting the joint reference signal according to a sequence associated with the identifier. In a variant, the configuration may include device-specific transmission configuration parameters.

A fourth embodiment may be directed to an apparatus including at least one processor and at least one memory comprising computer program code. The at least one memory and computer program code may be configured, with the at least one processor, to cause the apparatus at least to perform the method according to the first embodiment, the second embodiment, or the third embodiment, or any of the variants discussed above.

A fifth embodiment may be directed to an apparatus that may include circuitry configured to perform the method according to the first embodiment, the second embodiment, or the third embodiment, or any of the variants discussed above.

A sixth embodiment may be directed to an apparatus that may include means for performing the method according to the first embodiment, the second embodiment, or the third embodiment, or any of the variants discussed above. Examples of the means may include one or more processors, memory, and/or computer program codes for causing the performance of the operation.

A seventh embodiment may be directed to a computer readable medium comprising program instructions stored thereon for performing at least the method according to the first embodiment, the second embodiment, or the third embodiment, or any of the variants discussed above.

An eighth embodiment may be directed to a computer program product encoding instructions for performing at least the method according to the first embodiment, the second embodiment, or the third embodiment, or any of the variants discussed above.

BRIEF DESCRIPTION OF THE DRAWINGS

For proper understanding of example embodiments, reference should be made to the accompanying drawings, wherein:

FIG. 5a illustrates an example block diagram of an apparatus, according to an embodiment; and FIG. 5b illustrates an example block diagram of an apparatus, according to another embodiment.

DETAILED DESCRIPTION

Figure 1:
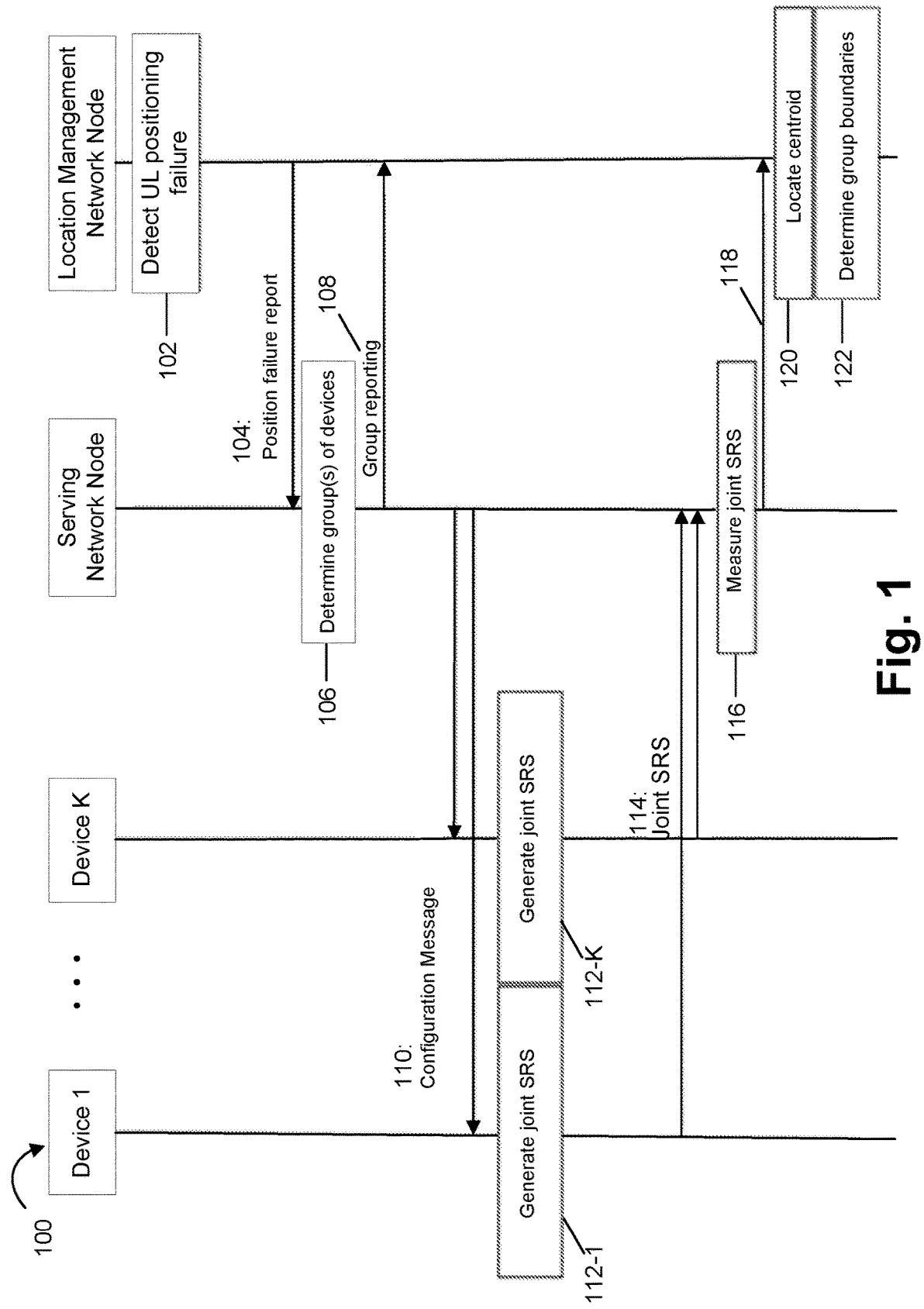
FIG. 1 illustrates an example signal diagram for asset tracking joint SRS transmission, according to some embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for asset tracking joint SRS transmission is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments. In addition, the phrase "set of" refers to a set that includes one or more of the referenced set members. As such, the phrases "set of," "one or more of," and "at least one of," or equivalent phrases, may be used interchangeably. Further, "or" is intended to mean "and/or," unless explicitly stated otherwise.

Additionally, if desired, the different functions or operations discussed below may be performed in a different order and/or concurrently with each other. Furthermore, if desired, one or more of the described functions or operations may be optional or may be combined. As such, the following description should be considered as merely illustrative of the principles and teachings of certain example embodiments, and not in limitation thereof.

Hyper tag devices may provide for localization of assets without requiring massive scale ecosystem deployment. Outdoors, tag devices may be localized through the public cellular network, and may provide global coverage and, for example, 10 to 20-meter accuracy with no dedicated equipment. In an indoor environment, tag devices may be located using densely deployed infrastructure locators and flexible perception gateways that may provide an accuracy of within 1-2 meters. Furthermore, the tag devices may provide an infrared (IR) beacon feature that allows infrastructure camera-based algorithms to enhance localization.

In order to allow tracking of handling and storage conditions, hyper tag devices may maintain 1) motion vectors, 2) ambience vectors, and 3) co-presence vectors using onboard components, such as accelerometers, temperature sensors, humidity sensors, and/or the like. These vectors may be offloaded periodically to the perception gateways in an energy-efficient way.

NR may implement native positioning support, including downlink time difference of arrival (DL-TDOA), uplink time difference of arrival (UL-TDOA), downlink angle of departure (DL-AoD), uplink angle of arrival (UL-AoA), or multi-cell round trip time (Multi-RTT). Accordingly, NR may enable radio access technology (RAT)-dependent (for both frequency range 1 (FR1) and FR2) and RAT-independent NR positioning techniques. In the downlink (DL), a positioning reference signal (PRS) was introduced in NR and in the uplink (UL) an SRS for positioning (SRS-P) was introduced in NR.

UL-TDOA is one of the NR methods and may rely on UL measurements/signals. With UL-TDOA, a UE may transmit the SRS-P to a gNB. The gNB may measure the relative time of arrival (RTOA) based on the SRS-P from the UE. The measurements may be reported to a location management function (LMF), which can then estimate the position of the UE. The gNB may report measurements over the NR positioning protocol A (NRPPa).

NR-LITE may address use cases with IoT-type parameters (e.g., low-complexity, enhanced coverage, long battery life, and a massive number of devices) that cannot be met by enhanced machine type communication (eMTC) and narrow band IoT (NB-IoT). In particular, NR-LITE parameters and/or use cases may include data rates up to 10-100 megabits per second (Mbps) (e.g., to support live video feed, visual production control, and/or process automation), latency of around 10-30 milliseconds (ms) (e.g., to support remote drone operation, cooperative farm machinery, time-critical sensing and feedback, and/or remote vehicle operation), positioning accuracy of around 30 centimeters (cm)-1 meter (m) (e.g., to support indoor asset tracking, coordinated vehicle control, and/or remote monitoring), module cost comparable to LTE, coverage enhancement of 10-15 decibels (dB) compared to enhanced mobile broadband (eMBB), and/or battery life at least 2-4 times longer than eMBB. In addition, NR-LITE features may include reduced bandwidth operation, complexity reduction techniques, coverage and reliability enhancements, device-to-device (D2D) communication, early data transmission, wake-up signal in idle mode, and/or grant-free transmission.

Low-cost asset tracking may be one aspect of NR. One aspect of asset tracking may include accurately providing the location of low cost and low power tag devices. Asset tracking may use a global system that covers diverse scenarios ranging from remote rural areas, urban outdoor areas, and indoor areas (including homes, offices, and larger factories). Accuracy needs for asset tracking may vary for these different scenarios. For example, there may be less strict accuracy needs for items that are located on highways or at sea, while items in denser areas such as, for example, factories and storage/delivery facilities, may have to use higher positioning accuracy. Tag devices may be collocated (e.g., bundled together), such as when they are used to tag packages or other goods that may need to be tracked (and which may be stacked and loaded together for shipping). One possible problem with such tag devices may relate to link budget and, specifically, the uplink transmission capabilities. The SRS reception by target gNBs may be limited due to the challenging propagation conditions. Thus, situations in which not enough gNBs detect a tag device from a bundle may arise more often than in the typical 5G NR scenario (e.g., SRS transmission by handheld 5G NR UEs). As such, there is a need for improved asset tracking in certain scenarios.

Some embodiments described herein may provide for asset tracking joint SRS transmission ("joint" and "multi-tag" may be used interchangeably herein). In certain embodiments, based on NR UL positioning for a set of K devices (e.g., tag devices) failing, a location management network node (e.g., an LMF) may send a positioning failure message to a serving network node (e.g., a gNB). A failure may occur when quality of service (QoS) or accuracy thresholds of positioning services are not satisfied. The message may include a list of identifiers for the devices for which positioning failed. The serving network node may check if one or more of the K devices can be grouped together for a joint SRS transmission. The serving network node may group devices if one or more criteria are met (e.g., the one or more criteria may be associated with identifying devices that are co-located). The one or more criteria may include whether the devices share a common serving beam index, have a similar value for a quality metric (e.g., reference signal receive power (RSRP), signal-plus-interference-to-noise ratio (SINR), and/or the like), have similar timing advances (TA) or the standard deviation of the TAs in the group is smaller than a threshold value, and/or experience similar propagation conditions (e.g., similar channel sparseness, power of the main detected tap, etc.). Channel impulse response may be estimated using a demodulation reference signal (DMRS) of physical uplink shared channel (PUSCH) reception.

In certain embodiments, when one or more of the devices can be grouped, the serving network node may assign and distribute, to the devices, a multi-tag-SRS sequence identifier that may be used by the devices in the group. The distribution of a single SRS sequence to devices in the group may be based on the devices experiencing the same or similar channel conditions, or one or more of the other criteria being satisfied.

In addition, the serving network node may compute and send, to the devices in the group, a multi-tag-SRS transmit configuration (e.g., a transmit precoder). The configuration may be tailored to the devices in the group (e.g., a different configuration for different devices in a group). The devices may receive the multi-tag-SRS sequence identifier and the multi-tag-SRS transmit configuration, and may perform a joint SRS transmission (e.g., a multi-tag-SRS transmission). One or more network nodes (e.g., gNBs) may detect the sequence and may compute a timing and/or angular positioning metric (e.g., an angle of arrival (AoA), a time of arrival (TOA), and/or the like), which the network nodes may send to the location management network node. The location management network node may compute a location of a centroid for the group of devices associated with the reported metric. In certain embodiments, the location management network node may request additional information (e.g., a TA, a serving beam index, a number of grouped devices, and/or the like) from the serving network node, and may determine geographic boundaries of the group of devices. Certain embodiments may include variations on the above procedures, as described elsewhere herein.

In this way, certain embodiments may help to overcome situations in which a group of NR devices that are transmitting SRS, e.g., at full power, are not being localized due to the poor SRS coverage (e.g., where the SRS cannot be received by enough gNBs to localize the devices). For example, the joint transmission of certain embodiments may provide for power boosting (e.g., up to 6 dB for 4 devices), which may increase the likelihood that the UL positioning session for the devices will be successful. As described herein, example embodiments can apply to various devices including a tag device (e.g., an asset tracking tag device), a UE, a mobile station IoT device, and/or the like.

FIG. 1 illustrates an example signal diagram 100 for asset tracking joint SRS transmission, according to some embodiments. As illustrated, the example 100 includes devices 1 through K, a serving network node (e.g., a serving gNB), and a location management network node (e.g., a LMF, a location management component (LMC), and/or the like).

As illustrated at 102, the location management network node may detect a UL positioning failure. For example, the operations of the example 100 may be triggered by the LMF as a result of a UL localization failure of one or more devices (e.g., devices 1 through K). In certain embodiments, the location management network node may perform the detection based on a quantity of UL-TDOA measurements being above or below a threshold, which may indicate that a set of devices have poor localization.

As illustrated at 104, the location management network node may transmit, and the serving network node may receive, a position failure report for the one or more devices. For example, the location management network node may transmit a position failure report to the serving network node serving the respective devices. Although devices 1 through K may be associated with one or more different serving network nodes, assume for the example 100 that the devices 1 through K are served by the same serving network node.

As illustrated at 106, the serving network node may determine one or more groups of devices (e.g., based on the position failure report). For example, the serving network node may evaluate whether one or more of the reported devices can be grouped together. The serving network node may select a multi-tag-SRS sequence identifier for the one or more groups of devices. For example, the multi-tag-SRS sequence identifier may identify the SRS that the corresponding group of devices is to transmit. The groups of devices may be based on one or more criteria as described elsewhere herein. Additionally, or alternatively, the groups of devices may be based on the assumption that the devices in a group are co-located (and hence may experience similar propagation conditions).

As illustrated at 108, the serving network node may transmit, and the location management network node may receive, a group reporting. For example, the reporting may include the groups of devices, configuration parameters for the devices, identifiers of the devices, multi-tag-SRS sequence identifiers for the groups of devices, and/or the like. Additionally, or alternatively, the serving network node may attach, to the group report, additional configuration elements of the devices in the group, such as a serving beam index, an estimated Doppler shift, and/or the like.

As illustrated at 110, the serving network node may transmit, and the devices 1 through K may receive, a configuration message. For example, the serving network node may transmit a separate configuration message to the devices in the groups. The configuration message may comprise configuration parameters (e.g., UL transmission parameters, such as a transmit precoder, a timing advance, transmit power control parameters, and/or the like), multi-tag-SRS sequence identifiers, and/or the like.

As illustrated at 112-1 through 112-K, the devices 1 through K may generate a joint SRS based on the configuration parameters received at 110. As illustrated at 114, the devices 112-1 through 112-K may transmit, and the serving network node may receive, the joint SRS. For example, the devices of a group may transmit the same SRS sequence, applying the device-specific configuration selected by the serving network node and provided to the devices at 110. As illustrated at 116, the serving network node may measure the joint SRS. For example, the serving network node may measure the joint SRS by performing a UL-TDOA procedure. As illustrated at 118, the serving network node may transmit, and the location management network node may receive, a reporting that includes the measurements of the joint SRS.

As illustrated at 120, the location management network node may locate the centroid of the groups of devices. In certain embodiments, the location management network node may, at 122, determine boundaries (e.g., geographic boundaries) of the groups of devices. Other methods of determining and/or defining the group location can be used with the embodiments described herein.

As described above, FIG. 1 is provided as an example. Other examples are possible, according to some embodiments.

As described above in connection with the example 100 of FIG. 1, the serving network node may group the devices based on evaluating whether the reported devices satisfy certain criteria. In other embodiments, the location management network node may group the devices based on radio link performance measurements (e.g., SRS RSRP and received signal strength indicator (RSSI)) from the serving network node and/or neighbor network nodes. Additionally, or alternatively, the device TA may be used by the location management network node to create the group of devices. As such, the location management network node may group devices based on device proximity obtained by, e.g., computing Euclidian distances between past locations of multiple devices, similar SRS radio link quality, whether less than a threshold number of network nodes report the devices (e.g., which may indicate a lack of link budget), and/or the like. The location management network node may then request the grouping procedure from the serving network node. For example, the LMF may signal the serving network node to perform a group sounding reference signal (SRS) procedure. As one example procedure, the LMF may send a signal to the serving network node that devices 1, 2, and 3 are requested to be in the same group for a joint SRS transmission. Then the devices, the serving network node, and the location management network node may perform operations similar to that described at 112 through 122 of FIG. 1. In certain embodiments, the serving network node may perform the grouping of the devices. In those embodiments, the LMF may just send a request to the serving network node to perform this grouping (e.g., the serving network node may determine that devices 1, 2, and 3 are to be in the same group) Similar to the example of 100, in embodiments where the location management network node groups the devices, it may be assumed that the devices are associated with the same serving network node.

In certain embodiments, the devices may be served by multiple serving network nodes rather than the same serving network node. In those cases, the location management network node may group the devices based on radio link performance measurements (e.g., SRS RSRP and RSSI) from multiple serving network nodes and target network nodes. Similar to certain embodiments described above, the location management network node may use a device TA to form the groups of devices. Also similar to certain embodiments described above, the location management network function may form the groups of devices based on similar coarse past position, similar SRS radio link quality, whether less than a threshold number of network nodes report the device, and/or the like. The location management network node may then request the grouping procedure via the serving network node, in a manner similar to that described above. The location management network node may request the grouping procedure from the serving network node with coordinated UL configuration, in a manner similar to that described above.

Figure 2:
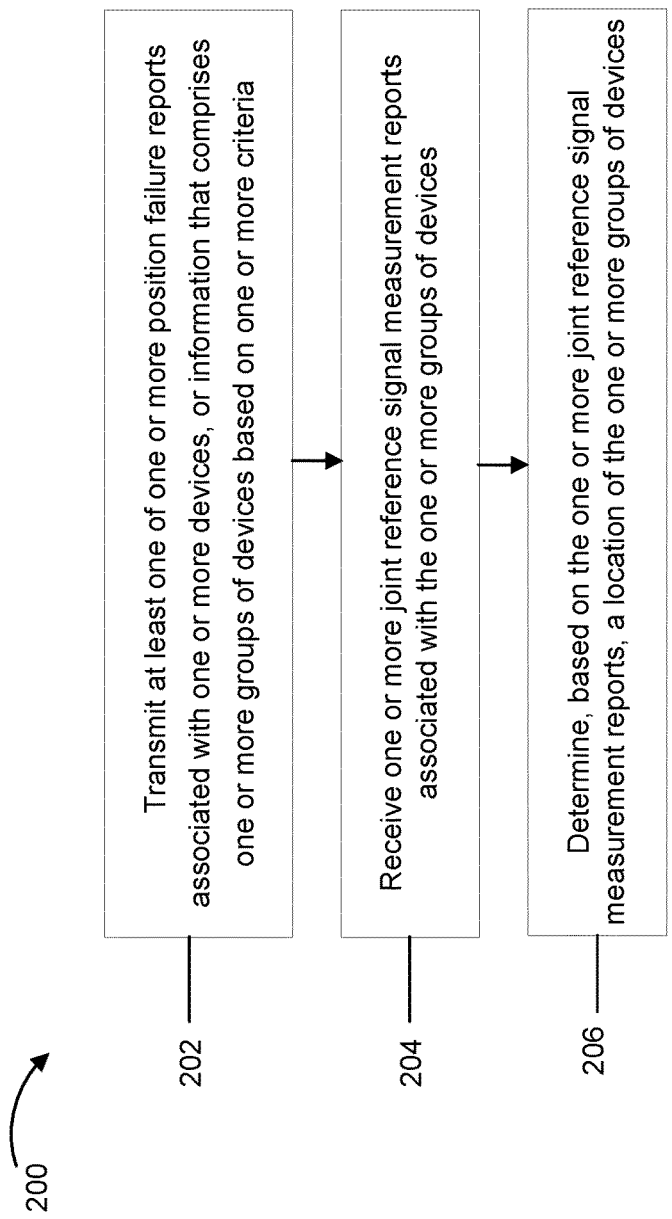
FIG. 2 illustrates an example flow diagram of a method, according to some embodiments.

FIG. 2 illustrates an example flow diagram of a method 200, according to some embodiments. For example, FIG. 2 may include example operations of a network node (e.g., apparatus 10 illustrated in, and described with respect to, FIG. 5a). In particular, FIG. 2 illustrates example operations of a location management network node. Some of the operations illustrated in FIG. 2 may be similar to some operations shown in, and described with respect to, FIG. 1.

In an embodiment, the method may include, at 202, transmitting at least one of one or more position failure reports associated with one or more devices, or information that comprises one or more groups of devices based on one or more criteria, for example, in a manner similar to that described at 104 of FIG. 1. The one or more groups of devices may be associated with transmitting a corresponding joint reference signal. The method may include, at 204, receiving one or more joint reference signal measurement reports associated with the one or more groups of devices, for example, in a manner similar to that described at 118 of FIG. 1. The method may include, at 206, determining, based on the one or more joint reference signal measurement reports, a location of the one or more groups of devices, for example, in a manner similar to that described at 120.

The method 200 illustrated in FIG. 2 may include one or more additional aspects described below or elsewhere herein. In some embodiments, the network node may determine that positioning for the one or more devices fails, for example, in a manner similar to that described at 102 of FIG. 1. In some embodiments, the one or more position failure reports may comprise a list of identifiers of the one or more devices associated with the failed positioning. In some embodiments, the network node may receive one or more reports that identify the one or more groups of devices after transmitting the one or more position failure reports, for example, in a manner similar to that described at 108 of FIG. 1. In some embodiments, the determining at 206 may include determining a boundary of the one or more groups of devices, for example, in a manner similar to that described at 122 of FIG. 1.

In some embodiments, the network node may determine the one or more groups of devices. In some embodiments, the one or more groups may be associated with a corresponding serving network node. In some embodiments, devices of the one or more groups may be associated with multiple serving network nodes. In some embodiments, the location may be a centroid of the one or more groups of devices. In some embodiments, the network node may request that a serving network node determine the one or more groups of devices.

As described above, FIG. 2 is provided as an example. Other examples are possible according to some embodiments.

Figure 3:
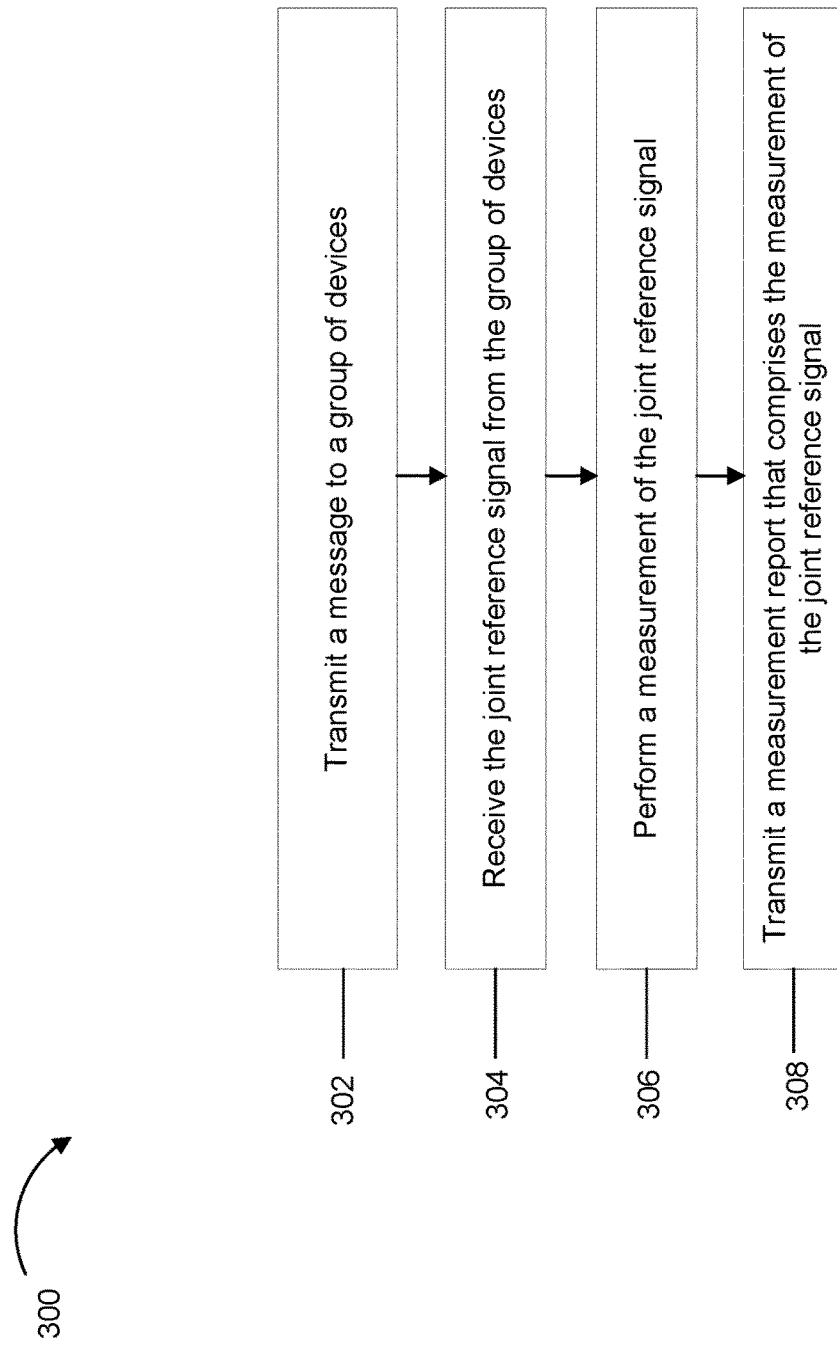
FIG. 3 illustrates an example flow diagram of a method, according to some embodiments.

FIG. 3 illustrates an example flow diagram of a method 300, according to some embodiments. For example, FIG. 3 shows example operations of a network node (e.g., apparatus 10 illustrated in, and described with respect to, FIG. 5a). In particular, FIG. 3 illustrates example operations of a serving network node. Some of the operations illustrated in FIG. 3 may be similar to some operations shown in, and described with respect to, FIG. 1.

In an embodiment, the method may include, at 302, transmitting a message to a group of devices, for example, in a manner similar to that described at 110 of FIG. 1. The message may be associated with configuring the group of devices to transmit a joint reference signal. The group of devices may be based on one or more criteria. The method may include, at 304, receiving the joint reference signal from the group of devices, for example, in a manner similar to that described at 114. The method may include, at 306, performing a measurement of the joint reference signal, for example, in manner similar to that described at 116. The method may include, at 308, transmitting a measurement report that comprises the measurement of the joint reference signal, for example, in a manner similar to that described at 118 of FIG. 1.

The method 300 illustrated in FIG. 3 may include one or more additional aspects described below or elsewhere herein. In some embodiments, the network node may receive a failure report associated with one or more devices, for example, in a manner similar to that described at 104 of FIG. 1. In some embodiments, the network node may group the one or more devices into the group of devices based one or more criteria, for example, in a manner similar to that described at 106 of FIG. 1. In some embodiments, the network node may transmit a report that identifies the group of devices, for example, in a manner similar to that describe at 108 of FIG. 1.

In some embodiments, the network node may determine an identifier for the joint reference signal in connection with grouping the devices, and may transmit the identifier, for example, in a manner similar to that described at 110 of FIG. 1. In some embodiments, devices of the group of devices may be associated with the serving network node, or at least one of the devices may be associated with one or more other serving network nodes. In some embodiments, the one or more criteria may comprise whether the group of devices share a common serving beam index, have a similar value for a quality metric, have similar timing advances or a standard deviation of the TAs in the group of devices is smaller than a threshold value, or experience similar propagation conditions.

As described above, FIG. 3 is provided as an example. Other examples are possible according to some embodiments.

Figure 4:
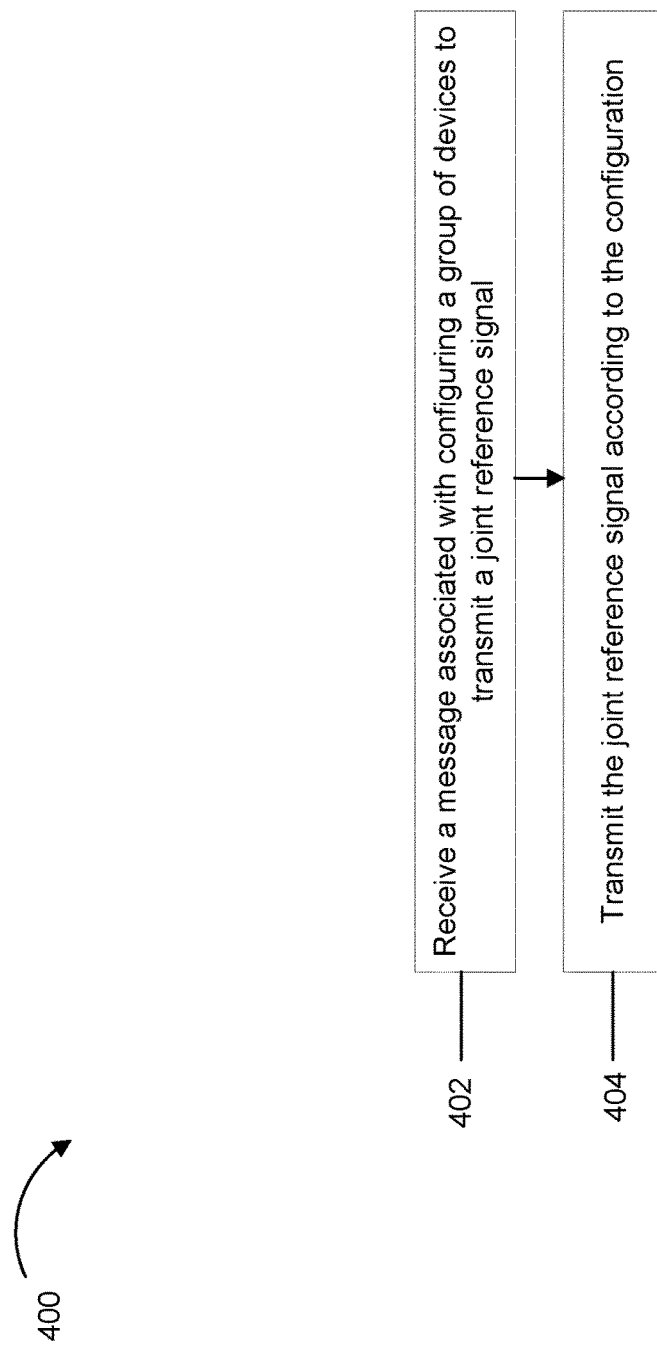
FIG. 4 illustrates an example flow diagram of a method, according to some embodiments.

FIG. 4 illustrates an example flow diagram of a method 400, according to some embodiments. For example, FIG. 4 may include example operations of a device (e.g., apparatus 20 illustrated in, and described with respect to, FIG. 5b). Some of the operations illustrated in FIG. 4 may be similar to some operations shown in, and described with respect to, FIG. 1.

In an embodiment, the method may include, at 402, receiving a message associated with configuring a group of devices to transmit a joint reference signal, for example, in a manner similar to that described at 110 of FIG. 1. The group of devices may be based on one or more criteria. The method may include, at 404, transmitting the joint reference signal according to the configuration, for example, in a manner similar to that described at 114 of FIG. 1.

The method illustrated in FIG. 4 may include one or more additional aspects described below or elsewhere herein. In some embodiments, the UE may receive an identifier for the joint reference signal. In some embodiments, the identifier may be included in the message or in another message. In some embodiments, the transmitting at 404 may include transmitting the joint reference signal according to a sequence associated with the identifier. In some embodiments, the configuration may comprise device-specific transmission configuration parameters.

As described above, FIG. 4 is provided as an example. Other examples are possible according to some embodiments.

FIG. 5a illustrates an example of an apparatus 10 according to an embodiment. In an embodiment, apparatus 10 may be a node, host, or server in a communications network or serving such a network. For example, apparatus 10 may be a network node (e.g., a serving network node), location management network node, satellite, base station, a Node B, an evolved Node B (eNB), 5G Node B or access point, next generation Node B (NG-NB or gNB), and/or a WLAN access point, associated with a radio access network, such as a LTE network, 5G or NR. In some example embodiments, apparatus 10 may be an eNB in LTE or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 5a.

As illustrated in the example of FIG. 5a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 5*a*, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the a ntenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like.

According to certain embodiments, apparatus 10 may be controlled by memory 14 and processor 12 to perform the functions associated with any of the embodiments described herein, such as some operations illustrated in, or described with respect to, FIGS. 1-3. For instance, apparatus 10 may be controlled by memory 14 and processor 12 to perform the methods of FIGS. 2 and/or 3.

FIG. 5*b* illustrates an example of an apparatus 20 according to another embodiment. In an embodiment, apparatus 20 may be a node or element in a communications network or associated with such a network, such as a device, UE, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 5b.

As illustrated in the example of FIG. 5b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 5b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry. As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with any of the embodiments described herein, such as some operations illustrated in, or described with respect to, FIGS. 1 and 4. For instance, in one embodiment, apparatus 20 may be controlled by memory 24 and processor 22 to perform the method of FIG. 4.

In some embodiments, an apparatus (e.g., apparatus 10 and/or apparatus 20) may include means for performing a method or any of the variants discussed herein, e.g., a method described with reference to FIGS. 2-4. Examples of the means may include one or more processors, memory, and/or computer program code for causing the performance of the operation.

Therefore, certain example embodiments provide several technological improvements, enhancements, and/or advantages over existing technological processes. For example, benefits of some example embodiments are extended positioning coverage for co-located and/or proximity of devices under challenging coverage conditions and/or increased positioning accuracy since more serving network nodes may be able to detect a device group. Accordingly, the use of some example embodiments results in improved functioning of communications networks and their nodes and, therefore constitute an improvement at least to the technological field of device tracking, among others.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations used for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein apply equally to both singular and plural implementations, regardless of whether singular or plural language is used in connection with describing certain embodiments. For example, an embodiment that describes operations of a single network node equally applies to embodiments that include multiple instances of the network node, and vice versa.

One having ordinary skill in the art will readily understand that the example embodiments as discussed above may be practiced with operations in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

PARTIAL GLOSSARY

AoA Angle of Arrival
BF Beamforming
DL PRS Downlink Positioning Reference Signal
gNB 5G Base Station
IoT Internet of Things
LCS Location Service
LMF Location Management Function
LPP LTE Positioning Protocol
NR New Radio (5G)
NRPPa New Radio Positioning Protocol A
RS Reference Signal
RSRP Reference Signal Received Power
RTT Round Trip Time
SRS Sounding Reference Signal
SRS-P SRS for positioning
UE User Equipment
UL Uplink
TA Timing Advance
SINR Signal Plus Interference to Noise Ratio
CIR Channel Impulse Response

The invention claimed is:

1. A method, comprising:
receiving, by a wireless handheld device, in downlink control signaling from a serving network node, a configuration message associated with configuring a group of devices to transmit a joint uplink sounding reference signal (SRS), wherein the group of devices is based on one or more criteria;
receiving, by the wireless handheld device, in the configuration message or in another downlink signaling message from the serving network node, an identifier for the joint uplink SRS, the configuration message further comprising device-specific uplink transmission configuration parameters including at least one of: a transmit precoder, a timing advance, or transmit power control parameters;
processing, by the wireless handheld device, the identifier and the device-specific uplink transmission configuration parameters to generate a joint uplink SRS for the device, including selecting a sequence corresponding to the identifier and applying the device-specific transmit precoder, timing advance, and/or transmit power control parameters to the joint uplink SRS prior to transmission; and transmitting, by the wireless handheld device, the joint uplink SRS to the serving network node on an uplink channel according to the configuration, wherein transmitting the joint uplink SRS comprises transmitting the joint uplink SRS to the serving node according to a sequence associated with the identifier and applying the device-specific uplink transmission configuration parameters to the joint uplink SRS transmission.

2. The method according to claim 1, wherein at least one of the devices of the group of devices is associated with the serving network node and at least one of the devices of the group of devices is associated with one or more other serving network nodes.

3. The method according to claim 2, wherein the one or more criteria comprise whether the group of devices: share a common serving beam index, have a similar value for a quality metric, have similar timing advances or a standard deviation of the timing advances in the group of devices is smaller than a threshold value, and experience similar propagation conditions.

4. The method according to claim 1, wherein the transmitting the joint uplink SRS comprises applying a device-specific transmit precoder provided by the serving network node.

5. The method according to claim 1, wherein the identifier for the joint uplink SRS comprises a multi-tag-SRS sequence identifier distributed by the serving network node to the devices of the group.

6. The method according to claim 1, wherein the device-specific transmission configuration parameters comprise at least one of: a transmit precoder, a timing advance, or transmit power control parameters.

7. The method according to claim 1, further comprising receiving, at the wireless handheld device, a configuration message comprising the identifier and the device-specific transmission configuration parameters.

8. The method according to claim 1, wherein the service network node performs measurements of the joint uplink SRS to determine at least one of: an angle of arrival (AoA) or a time of arrival (ToA) of the joint uplink SRS.

9. The method according to claim 1, wherein the service network node reports measurements of the joint uplink SRS to a location management network node, and the location management network node determines a centroid location of the group of devices.

10. The method according to claim 1, wherein the wireless handheld device is an IoT asset tracking tag device configured for uplink SRS positioning.

* * * * *